(12) United States Patent
Allinder

(10) Patent No.: US 7,400,517 B2
(45) Date of Patent: Jul. 15, 2008

(54) POWER FACTOR CORRECTION CIRCUIT AND METHOD THEREFOR

(75) Inventor: Terry Allinder, Mesa, AZ (US)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 86 days.

(21) Appl. No.: 11/479,198

(22) Filed: Jul. 3, 2006

(65) Prior Publication Data
US 2008/0002439 A1    Jan. 3, 2008

(51) Int. Cl.
*H02M 3/335* (2006.01)

(52) U.S. Cl. ............ 363/21.05; 363/21.07; 363/21.1; 323/207

(58) Field of Classification Search ............ 363/20, 363/21.1, 21.01, 21.04, 21.07, 21.09, 21.12, 363/21.15, 21.17, 21.18, 21.05; 323/266, 323/207
See application file for complete search history.

(56) References Cited

U.S. PATENT DOCUMENTS

| | | | |
|---|---|---|---|
| 5,006,975 A * | 4/1991 | Neufeld | 363/80 |
| 5,134,355 A | 7/1992 | Hastings | |
| 5,359,281 A | 10/1994 | Barrow et al. | |
| 5,502,370 A | 3/1996 | Hall et al. | |
| 6,198,638 B1 | 3/2001 | Lee | |
| 6,535,400 B2 | 3/2003 | Bridge | |
| 6,756,771 B1 | 6/2004 | Ball et al. | |

OTHER PUBLICATIONS

"NCP165X High-efficiency Single Stage Power Factor Correction with Ultra Fast Transient Response", On Semiconductor Engineering Data Sheet, Sep. 19, 2005, 8 pages.

* cited by examiner

*Primary Examiner*—Shawn Riley
(74) *Attorney, Agent, or Firm*—Robert F. Hightower

(57) ABSTRACT

In one embodiment, a power factor correction circuit is configured to use a stored value of a feedback signal to assist in regulating the value of an output voltage and to bypass the sample and hold circuit if the output voltage increase to an upper limit or decreases to a lower limit.

20 Claims, 2 Drawing Sheets

US 7,400,517 B2

POWER FACTOR CORRECTION CIRCUIT AND METHOD THEREFOR

BACKGROUND OF THE INVENTION

The present invention relates, in general, to electronics, and more particularly, to methods of forming semiconductor devices and structure.

In the past, the semiconductor industry utilized various structures and methods to form power factor correction circuits. The power factor was generally recognized as a measure of the difference between the voltage and current waveforms of an alternating current (AC) waveform. Differences between the current and voltage waveforms resulted in low efficiency utilization of the supplied AC power. Power factor correction circuits were utilized to more closely align the shape of the current and voltage waveforms in order to provide higher efficiency. Examples of power factor correction circuits are disclosed in U.S. Pat. No. 5,134,355 issued to Roy Alan Hastings on Jul. 28, 1992; U.S. Pat. No. 5,359,281 issued to Barrow et al on Oct. 25, 1994; and U.S. Pat. No. 5,502,370 issued to Hall et al on Mar. 26, 1996 all of which are hereby incorporated herein by reference.

One problem with the previous power factor control circuits was the transient response time. In order to reduce ripple in the output voltage, the bandwidth of the control loop generally was keep very low. The bandwidth of the control loop generally was about ten times less than the frequency of the AC input voltage and typically was limited to about ten to twelve Hz (10-12 Hz). Because of the low bandwidth, the previous power factor correction circuits generally had a slow response to transients on the output voltage.

Accordingly, it is desirable to have a method of forming a power factor correction device that has a wider loop bandwidth and that more quickly responds to output voltage transients.

For simplicity and clarity of the illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action.

DETAILED DESCRIPTION OF THE DRAWINGS

Figure 1:
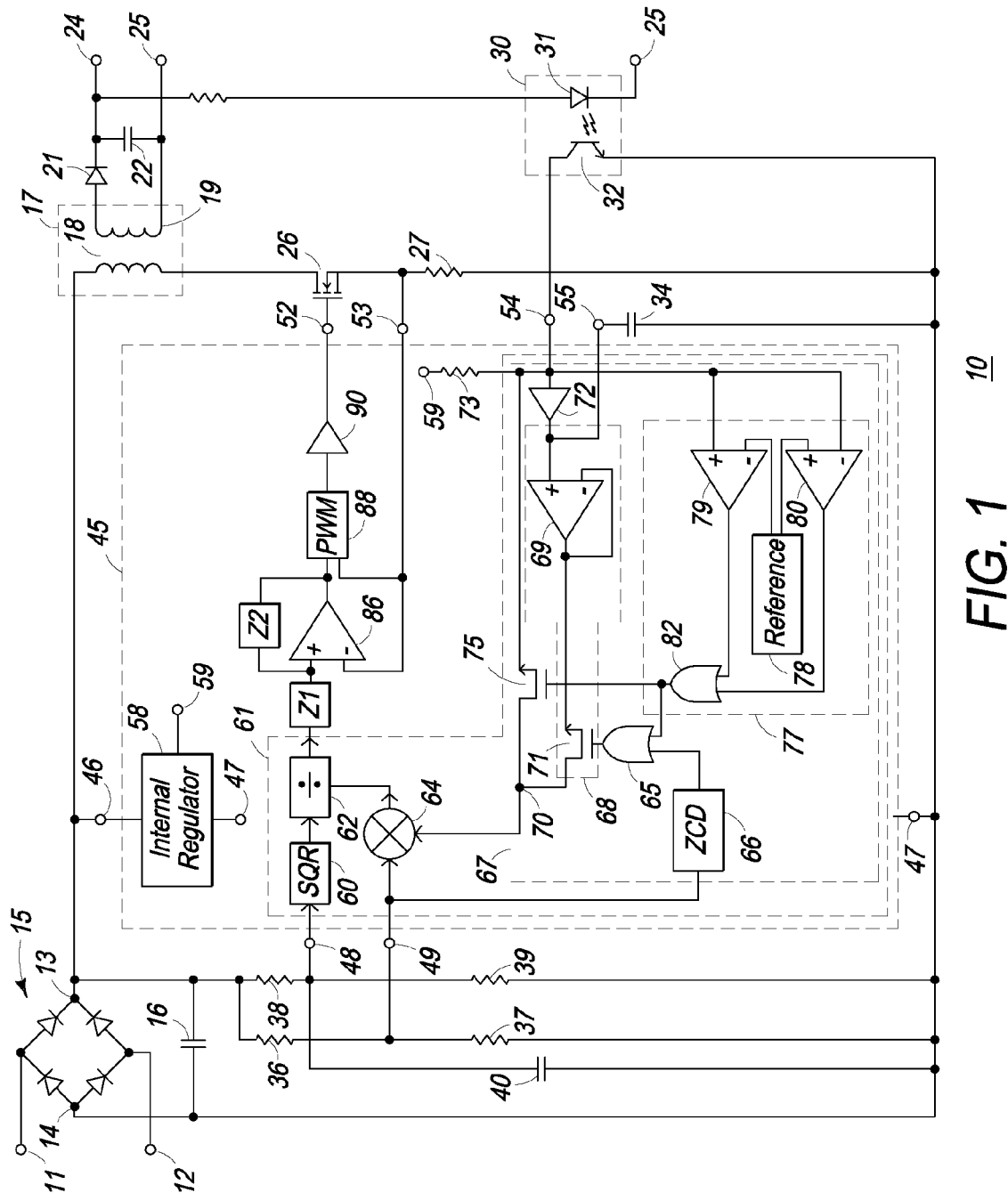
FIG. 1 schematically illustrates an embodiment of a portion of a power factor correction system having a power factor correction circuit in accordance with the present invention.

FIG. 1 schematically illustrates a portion of an embodiment of a power factor correction system 10 that includes a power factor correction circuit 45. Circuit 45 includes a sample and hold (S/H) circuit 67 that is configured to store a feedback signal that is representative of an output voltage of system 10 and to by-pass the stored value of the feedback signal responsively to a range of values of the output voltage. System 10 receives an AC voltage and current from an AC power source, such as a household mains, between an input terminal 11 and return terminal 12, and provides an output voltage between an output terminal 24 and an output common terminal 25. A rectifier 15 typically is used to rectify the AC voltage and form a rectified DC voltage between a power terminal 13 and a common terminal 14. A capacitor 16 may be used to filter the voltage supplied between terminals 13 and 14. System 10 generally includes a transformer 17 having a primary inductor 18 and a secondary inductor 19. Inductor 18 generally is connected to a power switch, such as a power transistor 26, that is used to control current flow through inductor 18. A resistor 27 may be connected to transistor 26 in order to form a current sense signal that is representative of the current flowing through inductor 18, thus, representative of the input AC current to system 10. A rectifier such as a diode 21 and a capacitor 22 may be connected to inductor 19 in order to rectify and filter the voltage from inductor 19 and form the output voltage between terminals 24 and 25. A feedback element may be used provide a feedback signal that is representative of the value of the output voltage between terminals 24 and 25. In the preferred embodiment, the feedback element includes an optical coupler 30 that has an optical emitter 31 that is connected between terminals 24 and 25 by a resistor. A phototransistor 32 of coupler 30 is connected to provide the feedback signal to an input 54 of circuit 45.

Circuit 45 receives power between a voltage input 46 and a voltage return 47. Input 46 and return 47 generally are connected to respective terminals 13 and 14. Circuit 45 generally includes an error amplifier 86, a pulse width modulated (PWM) controller 88, and a driver 90 that are utilized to form a switching control signal that is utilized to control the switching of transistor 26 in order to regulate the value of the output voltage. Amplifier 86 generally is a transconductance amplifier that includes compensation elements Z1 and Z2 connected thereto in order to provide gain control for amplifier 86 and to provide loop compensation for the control loop. Circuit 45 also includes a reference generator 61 that provides a reference signal to error amplifier 86. The reference signal includes a representation of the feedback signal in order to assist amplifier 86 in regulating the output voltage. Reference generator 61 includes a sample and hold (S/H) circuit 67, a digital multiplier 64, a squaring circuit (SQR) 60, and a divide circuit or divider 62. S/H circuit 67 includes a sampling circuit 68, a zero crossing detector (ZCD) 66, and a transient detector 77. Sampling circuit 68 includes a buffer 72, an amplifier 69, a first switch, implemented as a transistor 75, and a second switch, implemented as a transistor 71. Transient detector 77 includes a first comparator or upper transient comparator 79, a second comparator or lower transient comparator 80, and OR gates 82 and 65. Circuit 45 may also include an internal regulator 58 that is connected between input 46 and return 47. Regulator 58 provides an internal operating voltage on an output 59 that is used for operating some of the elements of circuit 45 such as amplifier 86, PWM controller 88, and reference generator 61.

Circuit 45 is configured to adjust the shape of the waveform of the incoming AC current to closely match the waveform of the input AC voltage. The current through transistor 26 represents the input AC current into system 10. Circuit 45 receives a current sense signal on a current sense input 53 that is representative of the value and the waveform and the input AC current. The input AC voltage is represented by an AC sense signal that is received on an input 49 and by a DC sense signal that is received on an input 48. The DC sense signal is a DC signal that is proportional to the value of AC line voltage which is received between terminals 13 and 14. A first voltage divider formed by resistors 36 and 37 forms the AC sense signal and a second voltage divider formed by resistors 38 and 39 in addition to a capacitor 40 forms the DC sense signal. The first and second voltage dividers are connected between terminals 13 and 14.

In operation, error amplifier 86 controls transistor 26 in a manner that attempts to keep the two inputs of amplifier 86 equal. Since the feedback signal is included in one of the signals received by amplifier 86, the output voltage between terminals 24 and 25 is regulated to a target value within a range of values around the target value. For example, the target value may be 3.0 volts and the range may be plus or minus five percent (5%) of the 3.0 volts. Thus, the target value may have a high value, for example 3.15 volts, and a low value, for example 2.85 volts. S/H circuit 67 stores the value of the feedback signal on a storage element or capacitor 34 and samples the stored value of the feedback signal at the zero crossing of the input AC voltage. Zero crossing detector (ZCD) 66 monitors the incoming AC sense signal on input 49 and provides a zero crossing detect signal on an output of ZCD 66 for each zero crossing of the input AC voltage. The detect signal enables transistor 71 which couples the stored value of the feedback signal to the output of S/H circuit 67 at node 70. The stored value of the feedback signal from node 70 is processed through reference generator 61 and is included in the signal received on the non-inverting input of amplifier 86. Amplifier 86 attempts to match this processed value of the feedback signal to the waveform and value of the incoming AC current via the current sense signal from input 53. Multiplier 64 receives the signal from the output of S/H circuit 67 on node 70 and multiplies it by the value of the AC sense signal. Squaring circuit (SQR) 60 receives the value of the DC sense signal and squares it to form a squared signal. Divider 62 divides the output of multiplier 64 by the squared signal from SQR 60 to form the reference signal that is applied to the non-inverting input of amplifier 86. Circuits such as amplifier 86, PWM controller 88, multiplier 64, divider 62, and SQR 60 are well known to those skilled in the art. The reference signal from divider 62 is represented by the equation below:

$$Vref=(Vfb*Vin1)/(Vin2)^2$$

Where

Vref=the reference signal from generator 61,

Vfb=value of the feedback signal on input 54,

Vin1=value of the signal on input 49, and

Vin2=value of the signal on input 48.

If there is a transient in the output voltage such as the output voltage rapidly changing, the bandwidth of the control loop through reference generator 61 and error amplifier 86 generally is too low to provide a rapid response to the change in the output voltage. Thus, S/H 67 includes transient detector 77 which causes the value of the feedback signal on input 54 to be fed forward to node 70 to bypass sampling circuit 68. If the value of the output voltage increases to a value that is greater than an upper limit, then the feedback signal increases to a first value that is greater than a value of a first reference signal from reference 78 and the output of comparator 79 is forced high. The high from comparator 79 disables transistor 71 through gate 65 to override the detect signal from ZCD 66 and to enable transistor 75 which connects the feedback signal directly to node 70 and multiplier 64. If the value of the output voltage decreases down to a value that is less than a lower limit, then the value of the feedback signal decreases to a second value of a second reference signal from reference 78 and the output of comparator 80 is forced high. The high from comparator 80 also blocks the detect signal and enables transistor 75 to connect the feedback signal directly to node 70 and multiplier 64. Thus, transient detector 77 couples the transient information from the output voltage, represented by the feedback signal, directly to multiplier 64 and to amplifier 86. This allows amplifier 86 to quickly respond to the transient condition and adjust the value of the output voltage to compensate for the transient. The upper limit generally is greater than the high value of the target range of the output voltage and the lower limit generally is less than the low value of the target range. The feedback signal remains connected to node 70 until the value of output voltage decreases below the upper limit to force comparator 79 low or increases past the lower limit to force comparator 80 low. Rapidly coupling the transient information contained in the feedback signal to amplifier 86 facilitates using a sampling period for S/H 67 that is lower than the one hundred twenty (120) Hz ripple from the input AC voltage thereby allowing the loop bandwidth to be higher, for example greater than 20 Hz. It is believed that the loop bandwidth can be at least twenty (20) Hz and may be as high as thirty (30) Hz. Also, less filtering is required on the AC sense signal thereby improving the line transient response.

In order to assist in implementing this functionality for circuit 45, and input 48 is connected to an input of SQR 60 which has an output connected to a first input of divider 62. Input 49 is commonly connected to a first input of multiplier 64 and an input of ZCD 66. The output of multiplier 64 is connected to a second input of divider 62. The output of divider 62 is connected to a non-inverting input of amplifier 86 through impedance Z1 and is also connected to the output of amplifier 86 through impedance Z2. An inverting input of amplifier 86 is connected to input 53 and to a first input of controller 88. A second input of controller 88 is connected to the output of amplifier 86. The output of controller 88 is connected to a first input of driver 90 which has an output connected to output 52 of circuit 45. A second input of multiplier 64 is connected to node 70. The output of ZCD 66 is connected to a first input of gate 65 which has an output connected to a gate of transistor 71. The drain of transistor 71 is connected to node 70 and a source is commonly connected to the output of amplifier 69 and an inverting input of amplifier 69. A non-inverting input of amplifier 69 is commonly connected to input 55 and an output of buffer 72. Input 55 is configured to be connected to a first terminal of capacitor 34 which has a second terminal connected to return 47 of circuit 45. An input of buffer 72 is commonly connected to input 54, a source of transistor 75, a first terminal of resistor 73, a non-inverting input of comparator 79, and an inverting input of comparator 80. A second terminal of resistor 73 is connected to receive the internal operating voltage such as on output 59 of regulator 58. A non-inverting input of comparator 79 is connected to a first output of reference 78. The output of comparator 79 is connected to a first input of gate 82. A non-inverting input of comparator 80 is connected to a second output of reference 78. The output of comparator 80 is connected to a second input of gate 82. An output of gate 82 is commonly connected to the gate of transistor 75 and a second input of gate 65.

Figure 2:
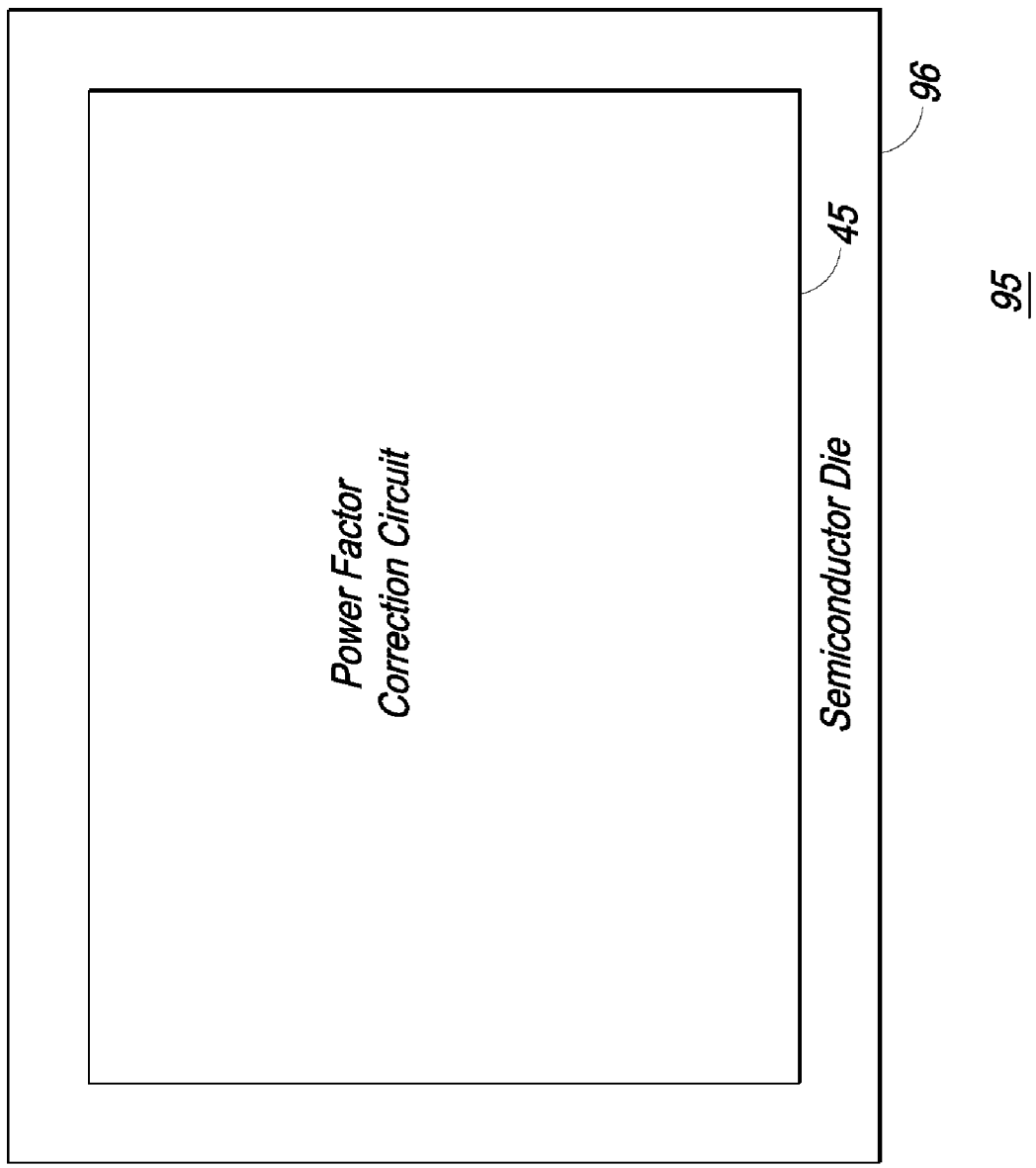
FIG. 2 schematically illustrates an enlarged plan view of a semiconductor device that includes the power factor correction circuit of FIG. 1 in accordance with the present invention.

FIG. 2 schematically illustrates an enlarged plan view of a portion of an embodiment of a semiconductor device or integrated circuit 95 that is formed on a semiconductor die 96. Circuit 45 is formed on die 96. Die 96 may also include other circuits that are not shown in FIG. 2 for simplicity of the drawing. Circuit 45 and device or integrated circuit 95 are formed on die 96 by semiconductor manufacturing techniques that are well known to those skilled in the art.

In view of all of the above, it is evident that a novel device and method is disclosed. Included, among other features, is configuring the power factor correction circuit to use a stored value of the feedback signal to assist in regulating the value of the output voltage and to bypass the sample and hold circuit if the output voltage increase to an upper limit or decreases to a lower limit.

While the subject matter of the invention is described with specific preferred embodiments, it is evident that many alternatives and variations will be apparent to those skilled in the semiconductor arts. Those skilled in the art will appreciate that the order in which the components are interconnected can be interchanged as long as the transfer function implements the equation $Vref=(Vfb*Vin1)/(Vin2)^2$. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A power factor correction circuit comprising:
   an ac input configured to receive a first ac signal;
   a zero crossing detector configured to receive the first ac signal and generate a detect signal representing a zero crossing of the first ac signal;
   a switching output configured to control a power switch to regulate an output voltage to a target value within a range of values that includes a first value that is greater than the target value and a second value that is less than the target value;
   a sample and hold circuit configured to receive a feedback signal that is representative of the output voltage, to store a value of the feedback signal on a storage element, to couple a stored value of the feedback signal to an output of the sample and hold circuit responsively to the detect signal, and to couple the feedback signal to the output of the sample and hold circuit responsively to the feedback signal increasing to a third value that is greater than the first value or decreasing to a fourth value than is less than the second value; and
   an error amplifier configured to receive a first signal that includes a second signal from the output of the sample and hold circuit and responsively provide an error signal.

2. The power factor correction circuit of claim 1 further including a multiplier circuit coupled to multiply the output of the sample and hold circuit with the first ac signal wherein the first signal received by the error amplifier includes an output signal of the multiplier circuit.

3. The power factor correction circuit of claim 2 further including a squaring circuit coupled to receive a dc signal and mathematically square the second ac signal to form a squared signal.

4. The power factor correction circuit of claim 3 further including a divider circuit coupled to receive the squared signal and divide the output signal of the multiplier circuit by the squared signal wherein the first signal received by the error amplifier includes an output signal of the divider circuit.

5. The power factor correction circuit of claim 1 wherein the sample and hold circuit includes a first comparator configured to detect the feedback signal increasing to the third value.

6. The power factor correction circuit of claim 5 wherein the sample and hold circuit includes a second comparator configured to detect the feedback signal decreasing to the fourth value.

7. The power factor correction circuit of claim 6 wherein the sample and hold circuit couples the feedback signal to the output of the sample and hold circuit responsively to an output of either the first or second comparators.

8. The power factor correction circuit of claim 6 wherein the sample and hold circuit includes an OR gate coupled to receive an output of the first comparator and an output of the second comparator and also includes an output coupled to control the sample and hold circuit to couple the feedback signal to the output of the sample and hold circuit.

9. The power factor correction circuit of claim 1 wherein the sample and hold circuit includes a first switch having a first terminal coupled to receive the feedback signal and a second terminal coupled to the output of the sample and hold circuit, and a second switch having a first terminal coupled to receive a stored value of the feedback signal from the storage element and a second terminal coupled to the output of the sample and hold circuit.

10. The power factor correction circuit of claim 1 wherein the sample and hold circuit includes an amplifier having an input coupled to a storage element to receive the stored value of the feedback signal.

11. A method of forming a power factor circuit comprising:
   configuring a switching portion of the power factor circuit to form a control signal to control a value of an output voltage within a range having an upper value and a lower value;
   configuring a sample and hold circuit of the power factor circuit to sample a value of a feedback signal wherein the feedback signal is representative of a value of the output voltage; and
   configuring the power factor circuit to by-pass the sample and hold circuit and couple the feedback signal to an output of the sample and hold circuit responsively to the output voltage being no less than the upper value or no greater than the lower value.

12. The method of claim 11 wherein configuring the sample and hold circuit of the power factor circuit to sample the value of the feedback signal includes configuring the sample and hold circuit to sample the value of the feedback signal responsively to a zero crossing of an ac input signal received by the power factor circuit.

13. The method of claim 12 wherein configuring the sample and hold circuit to sample the value of the feedback signal responsively to the zero crossing includes configuring the sample and hold circuit to store a value of the feedback signal and to sample a stored value of the feedback signal responsively to the zero crossing of the ac input signal.

14. The method of claim 11 further including configuring an error amplifier coupled to receive a first signal that includes a second signal on an output of the sample and hold circuit.

15. The method of claim 11 further including coupling a multiplier to receive a signal on the output of the sample and hold circuit and multiply the signal by a first ac input signal received by the power factor circuit.

16. The method of claim 15 further including coupling a squaring circuit to square a dc input signal.

17. The method of claim 16 further including coupling a divide circuit to divide an output of the multiplier by an output of the squaring circuit.

18. The method of claim 17 further including coupling an error amplifier to receive an output of the divide circuit and responsively form an error signal.

19. The method of claim 11 further including coupling a first comparator to compare the feedback signal to a first reference signal and form a first control signal to cause the power factor circuit to couple the feedback signal to the output of the sample and hold circuit.

20. A method of forming a power factor circuit comprising:

configuring a switching portion of the power factor circuit to form a control signal to control a value of an output voltage within a range having an upper value and a lower value;

configuring a sample and hold circuit of the power factor circuit to sample a value of a feedback signal wherein the feedback signal is representative of a value of the output voltage;

configuring the power factor circuit to by-pass the sample and hold circuit and couple the feedback signal to an output of the sample and hold circuit responsively to the output voltage being no less than the upper value or no greater than the lower value;

coupling a first comparator to compare the feedback signal to a first reference signal and form a first control signal to cause the power factor circuit to couple the feedback signal to the output of the sample and hold circuit; and coupling a second comparator to compare the feedback signal to a second reference signal and form a second control signal to cause the power factor circuit to couple the feedback signal to the output of the sample and hold circuit.

* * * * *